United States Patent [19]

Day

[11] Patent Number: 4,479,560

[45] Date of Patent: Oct. 30, 1984

[54] PORTABLE PALLET WEIGHING APPARATUS

[75] Inventor: Richard M. Day, Severna Park, Md.

[73] Assignee: The United States of America as represented by the Administrator of the National Aeronautics and Space Administration, Washington, D.C.

[21] Appl. No.: 409,680

[22] Filed: Aug. 19, 1982

[51] Int. Cl.³ ............... G01G 19/14; G01G 21/08; G01N 3/00

[52] U.S. Cl. .................. 177/147; 177/260; 73/862.54

[58] Field of Search ............ 177/253, 255, 146, 147, 177/260; 73/862.54

[56] References Cited

U.S. PATENT DOCUMENTS

| | | | |
|---|---|---|---|
| 3,517,762 | 6/1970 | Hedger | 177/147 |
| 4,027,736 | 6/1977 | Bohlin et al. | 177/147 |
| 4,305,475 | 12/1981 | Wacker | 177/147 |

Primary Examiner—E. A. Goldberg
Assistant Examiner—Patrick W. Foster
Attorney, Agent, or Firm—John O. Tresansky; John R. Manning; Robert E. Bushnell

[57] ABSTRACT

An assembly (10) for use with several like units in weighing the mass of a loaded cargo pallet supported by its trunnions (12) has a bridge frame (20) for positioning the assembly on a transportation frame carrying the pallet while straddling one trunnion of the pallet and its trunnion lock, and a cradle assembly (60) for incrementally raising the trunnion. The mass at the trunnion is carried as a static loading by a slidable bracket (40) mounted upon the bridge frame for supporting the cradle assembly. The bracket (40) applies the static loading to an electrical load cell (80) symmetrically positioned between the bridge frame (20) and the bracket (40). The static loading compresses the load cell, causing a slight deformation and a potential difference at load cell terminals (86) which is proportional in amplitude to the mass of the pallet at the trunnion.

6 Claims, 3 Drawing Figures

PORTABLE PALLET WEIGHING APPARATUS

ORIGIN OF THE INVENTION

The invention described herein was made by an employee of the U.S. Government and may be manufactured and used by or for the Government for governmental purposes without the payment of any royalties thereon or therefor.

TECHNICAL FIELD

The invention relates generally to mass determination devices and, more particularly, to a portable device for weighing objects.

BACKGROUND ART

For safe lift-off, flight and landing, the mass and center of gravity of space vehicles, as well as of aircraft generally, must lie within predetermined ranges unique to each vehicle. To assure that these ranges are not exceeded, the mass and center of gravity of a vehicle is first determined while the vehicle is in an unloaded state. Then, the mass and center of gravity is determined for each item of cargo and a manifest is prepared for a balanced distribution of the cargo within the vehicle. Recent techniques for determining the mass and center of gravity usually require that each item be separately placed on a tilting type table, and then either weighed in several positions or balanced in a three-coordinate jig.

As the cargo carrying capacity of space vehicles increases, this procedure became excessively time consuming. With the advent of the Shuttle type space vehicle, it became possible to assemble the cargo into individual lots aboard pallets and then place the loaded pallets aboard the vehicle. Pallets usually have four trunnions that extend beyond the sides of the pallet in a single horizontal plane. Although pallets and their transportation frames differ in shape and construction so as to conform to particular or unique items of cargo, the size, spacing and location of the pallet's trunnions are standardized to facilitate stowage of pallets during preparation for flight.

Loaded pallets are too bulky and heavy to be weighed on tilting tables or jigs and must, therefore, be raised by a pair of large overhead cranes having electrical load cells attached to its spreader bars. Then, if the mass or center of gravity of the pallet is found to be unacceptable, either some cargo is removed from the pallet or the pallet is unloaded and the cargo reloaded to provide an acceptable distribution of mass within the pallet. This is an overly time consuming and expensive procedure because each pallet is typically carefully loaded with unique items of cargo such as precision scientific instruments at research laboratories or other distant points of origin usually lacking such facilities as overhead cranes for weighing the loaded pallets, and then packed in a special transportation frame to protect the cargo against vibration and shock. The loaded pallet and its transportation frame is subsequently shipped to a launch site where the pallet is completely removed from its transportation frame and weighed. If weighing indicates that the loading of the pallet is unacceptable, the pallet must be returned to its point of origin, unpacked, and reloaded, an expensive and time consuming requirement.

Recent suggestions for alleviating the expensive and inconvenience of this requirement have included the installation of a pair of overhead cranes of adequate capacity at each point of origin. Such suggestions, however, are impractical because of the cost of both the cranes and their associated facilities, and unfeasible because many points of origin may load pallets only infrequently. Furthermore, even when available, dual overhead cranes which are, by nature, stationary installations, require that pallets be both loaded and weighed within a single area in close proximity to the cranes, thereby preventing both dispersion of the pallets and cargo to decentralized locations more convenient to the responsible personnel and use of the cranes and their associated facilities for other purposes during loading and weighing of a pallet. Moreover, weighing loaded pallets with overhead cranes is not a particular reliable procedure because the spreading bars and slings used with overhead cranes to weigh loaded pallets frequently cause the pallet to swing or sway during lifting which causes a preliminary distribution of cargo to shift within the pallet, thereby necessitating rearrangement of the cargo. Also, unexpected swinging or swaying can cause damage to the cargo as well as injury to attendant personnel.

STATEMENT OF INVENTION

Accordingly, it is one object of the present invention to provide an improved apparatus for determining the mass and center of gravity of large objects.

It is another object to provide an inexpensive apparatus for more rapidly determining the mass and center of gravity of loaded cargo pallets.

It is still another object to provide a portable apparatus for determining the mass and center of gravity of loaded cargo pallets.

It is a further object to provide a more reliable and safer apparatus for determining the mass and center of gravity of loaded cargo pallets.

These and other objects are achieved with an apparatus for weighing an object by incrementally lifting one member protruding from the object above a position of static rest. The apparatus includes a frame, an assembly for lifting the protruding member, a bracket able to slide relative to the frame while carrying the lifting assembly, and a load cell positioned between the frame and bracket for indicating the mass of the object at the protruding member.

BRIEF DESCRIPTION OF THE DRAWINGS

A more complete appreciation of this invention and many of the attendant advantages thereof will be readily apparent as the same becomes better understood by references to the following detailed description when considered in conjunction with the accompanying drawings in which like numbers indicate the same or similar components, wherein.

DETAILED DESCRIPTION OF THE INVENTION

Figure 1:
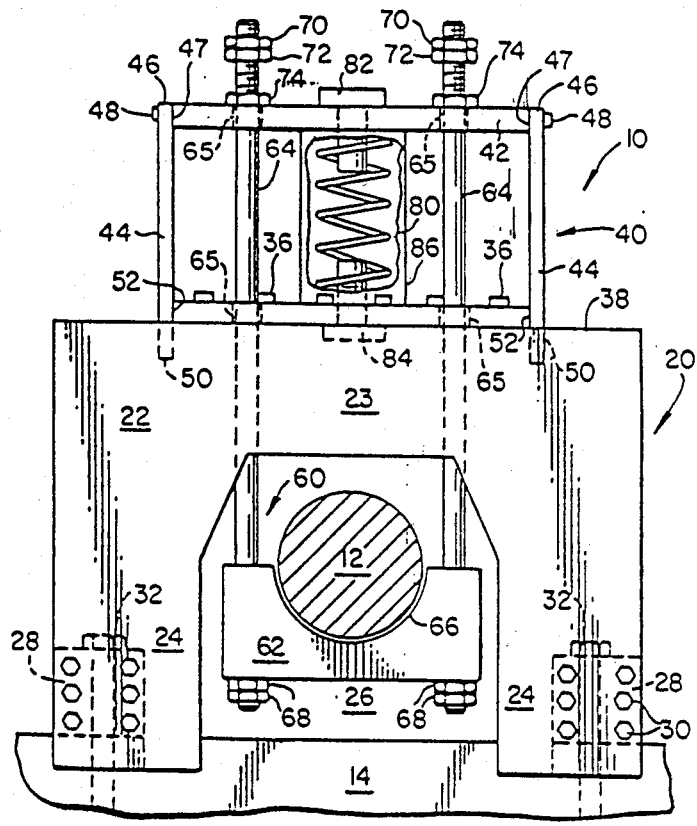
FIG. 1 is a front view of one embodiment of the invention.
Figure 2:
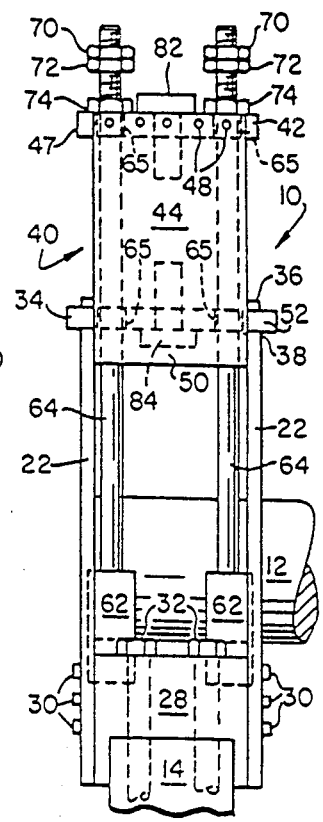
FIG. 2 is a side view of the embodiment of FIG. 1.

Refer now to the drawings and, in particular, to FIGS. 1 and 2 which illustrate a portable apparatus 10 for weighing the mass at one trunnion 12 of a cargo pallet (not shown) without removing the pallet from its transportation frame 14.

Weighing apparatus 10 has a frame 20 made of a pair of parallel spaced flat rigid plates 22, each having a central span 23 and a pair of vertical legs 24 extending downward from the span and forming a central arch 26. The arches 26 are designed to straddle a trunnion 12 and its associated lock (not shown) on the transportation frame 14 and thereby permit the apparatus 10 to be mounted upon an upper side of transportation frame 14 with the legs 24 of the plates 22 positioned transversely to the sides of the trunnion. A pair of blocks 28 interconnect the two plates 22 at distal sections of their legs 24. Small bolts 30 securely attach the saddle blocks 28 to the plates' legs 24. A pair of longer bolts 32 extend through both saddle blocks to securely fasten the weighing apparatus to the side of the transportation frame. A flat plate 34 lies across and is attached by small bolts 36 to the upper horizontal extremities 38 of plates 22. Plate 34 is symmetrically positioned above arches 26 to assure an equal distribution between legs 24 of any applied load.

Weighing apparatus 10 has a bracket 40 mounted upon frame 20. The bracket has a plate 42 symmetrically positioned relative to the plate 34 and a pair of plates 44 attached at their upper extremities 46 to opposite extremities 47 of plate 42 by small bolts 48. The lower, distal extremities 50 of both end plates 44 extend vertically downward over the opposite extremities 52 of plate 34 and between the plates 22. Bracket 40 is free to slide vertically relative to frame 20. An epoxy coating between the extremities 50 and extremities 52 facilitates the sliding of bracket 40.

A cradle assembly 60 is included in the weighing apparatus 10 which is made from a pair of blocks 62 each symmetrically suspended from plate 42 by a pair of long, vertical rods 64. Rods 64 pass through smooth holes 65 in plates 34 and 42. Both blocks are shaped to provide a central semi-circular recess 66 which conforms to the lower circumferential surface of the trunnion 12. Smooth vertical bores are formed in both ends of the blocks to accommodate the lower extremities of rods 64. The lower portions of rods 64 are threaded and engaged by a pair of jamb nuts 68. The pair of blocks 62 rests upon the upper one of the nuts 68 and are free to slide vertically upward along rods 64. The upper portions of the rods 64 are each threaded and engaged by three nuts 70, 72 and 74. Nuts 70 and 72 are jambed together and spaced apart from nuts 74 to provide a mechanism for rotating rods 64 and thereby raising blocks 62 in a manner hereinafter described, while nuts 74 rest against the upper surface of plate 42, thereby providing bearing surfaces to allow rods 64 to hang suspended from plate 42.

An electrical cylindrically shaped load cell 80 is symmetrically positioned between plates 34 and 42 with the base surface of cell 80 resting upon the upper surface of plate 34. Any of several commercially available models of cells of sufficient capacity such as a 5000 pound capacity type UP1-5-B manufactured by Revere Corporation of America may be used as a load cell. A pin 82 is force fit through plate 42 to hold the upper surface of cell 80 in place while a similar pin 84 is force fit through plate 34 to restrain the lower surface of the cell. Compression of load cell 80 between plates 34 and 42 by loading plate 42 with cradle assembly 60 causes a slight deformation of the load cell which produces a potential difference between output leads 86 of the cell. The amplitude of this potential difference is directly proportional to the deformation of load cell 80, and may, therefore, be used to measure the loading of plate 42 by the cradle assembly 60.

A weighing apparatus 10 can be used in conjunction with three identical units to weigh a loaded pallet having four trunnions without removing the pallet from its transportation frame. When so used, the cradle assembly 60 of each unit 10 is first lowered by rotating rods 64 until the recesses 66 can slide under the lower surface of each trunnion 12 while the legs 24 are placed along opposite edges on the adjacent side of the transportation frame 14. After both blocks 28 of each unit is resting level against the upper edge of the transportation frame 14, long bolts 32 are screwed through the blocks and into the sides of the transportation frame, thereby securely, albeit temporarily, attaching each unit 10 to the transportation frame. The cradle assembly 60 of each unit 10 is then raised by rotating rods 64 until the recesses 66 of each block 62 firmly engage the lower surface of each trunnion 12. Rods 64 are rotated by positioning nuts 74 on each rod 64 tightly against the top surface of plate 42. Then, while nut 74 on one rod 64 of each unit is held stationary relative to plate 42, the intermediate nut 72 is turned against the upper nut 70, thus causing rod 64 to rotate. As it rotates, the threads of rod 64 draw the rod through holes 65 and the corresponding threads of nut 74, thereby incrementally raising one end of one block 62 in each unit. This step is repeated for each of the four of each unit, preferably in a diagonally crossed sequence, until each trunnion is completely raised, by a very small distance, e.g., between twenty to thirty thousandths of an inch, above the corresponding cradle lock of the transportation frame. These clearances may be readily checked by inserting a feeler gauge between each trunnion and its lock. In this raised position the total mass of the pallet and its cargo is directly borne by the four weighing units. The fraction of the total mass supported by each trunnion is carried by the corresponding cradle assembly 60 and applied as a static load to plate 42 via rods 64 and nuts 74. The static loading of plate 42 is, in turn, applied as a compressive loading to load cell 80, thereby producing a potential output proportional in amplitude to the loading and to the fraction of the total mass supported by the corresponding trunnion.

The potential output may be either read directly with a voltmeter or applied simultaneously with the potential outputs of the load cells of the other units 10 to separate terminals of an appropriately calibrated commercially available Wheatstone bridge instrument such as an electronic aircraft weighing kit, Model C-46770, manufactured by the Revere Corporation of America. The total mass of the pallet and its cargo may be readily determined by adding the loading indicated by the potential output of each load cell.

A horizontal plane center of gravity for the pallet and its cargo also may be calculated by simultaneously solving equations describing the sum of the moments occurring at each of the trunnions for both coordinates of the pallet's horizontal plane.

It is apparent from the foregoing the weighing apparatus disclosed provides an portable device for weighing as well as allowing an operator to determine the center of gravity of a loaded pallet without removing the pallet from its transportation frame. This permits the mass and horizontal plane center of gravity of a loaded pallet to be determined as soon as the pallet is loaded without the inconvenience or risk of cargo damage concomitant to transporting the lloaded pallet to a facility equiped with dual overhead cranes and to removing the loaded pallet from its transportation frame. Moreover, the incremental amount by which the weighing apparatus lifts a trunnion reduces both the risk and severity of any cargo damage due to a pallet swinging, swaying or falling during a weighing procedure.

Figure 3:
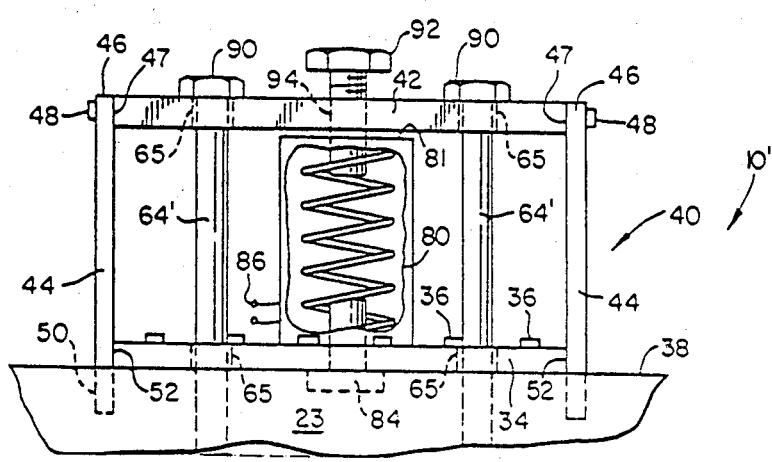
FIG. 3 is a partial front view of an alternative embodiment of the invention.

Several modifications may be made to the structure of weighing assembly 10 without departing from the principles of the invention. FIG. 3 illustrates an alternative embodiment 10' of the weighing assembly. In this embodiment, long hex head bolts 64' are used in the cradle assembly instead of threaded rods 64 shown in FIG. 1. The heads 90 of these bolts bear upon the upper surface of plate 42. A single threaded, hex head bolt 92 is used in bracket 40 to engage threads in a hole 94 centered in plate 42 above the upper base of load cell 80. When bolt 92 if rotated by turning its head, its distal end bears axially against the central area of the upper base surface 81 of load cell 80. Load cell 80 remains stationary relative to plate 34. The concomitant rotation of the threaded intermediate length of bolt 92 incrementally lifts cap plate 42, end plates 44, and the bolts 90 of the cradle assembly, thereby causing blocks 62 to incrementally raise trunnion 12 from its trunnion lock. This embodiment facilitates a weighing procedure by permitting a trunnion to be raised with the adjustment of a single bolt 92 in the bracket 40 instead of sequentially adjusting a plurality of rods in a cradle assembly.

I claim:

1. A weighing device, comprising:
   means (20) connectable to one side of a frame supporting at least one horizontally extending member of a mass, for straddling said horizontally extending member;
   means (80) carried by said straddling means for indicating a compressive loading;
   means (40) supported by said indicating means and slidably positioned upon said straddling means for transmitting a compressive loading to said indicating means; and
   means (60) attached to said transmitting means and extending from said straddling means for lifting said extending member from said frame.

2. The device of claim 1 wherein said straddling means is stationary relative to said frame and said lifting means is positioned to slide vertically relative to said straddling means and said frame.

3. The device of claim 2 wherein said lifting means comprises a first plurality of elements (64) slidably transversing said transmitting means, a second plurality of elements (70, 71, 72) rotatably engaging said first plurality of elements, and a plurality of blocks (62) carried by said first plurality of elements.

4. The device of claim 2 wherein said lifting means comprises a plurality of elongate members (64') transversing said transmitting means, and a central member (92) separated from said elongate members having a first portion bearing against said indicating means and a second portion adjacent said first portion engaging said transmitting means.

5. The device of claim 1 wherein said lifting means further comprises a plurality of blocks (62).

6. A weighing device, comprising:
   a pair of spaced apart blocks (28);
   a first pair of parallel spaced plates (22) each having spans (23) and a pair of distal extremities (24) extending from said spans, joined together between said distal extremities by said pair of blocks;
   a first single plate (34) pierced by a plurality of openings (65), positioned transversly to said spans and connected to said pair of parallel spaced plates;
   a second pair of parallel spaced plates (44) positioned transversely to said first pair of parallel spaced plates and having inner opposed surfaces slidably abutting opposite ends (52) of said first single plate;
   a second single plate (42) apart from said first single plate, including a plurality of openings (65) and having opposite ends connected to said second pair of parallel spaced plates;
   means (80) positioned between said first and second single plates for indicating a compressive loading;
   a plurality of elongate members (64) having threaded ends portions and central portions said central portions being inserted tranversely through both of said openings (65) in plate (42) elements (70, 72) disposed on one of said threaded end portions of each of said plurality of elongate members for rotation of said elongate members; and
   a third block (62) having a central recess (66), coupled to said elongate members along opposite sides of said central recess.

* * * * *